United States Patent
Kaneuchi et al.

(10) Patent No.: US 11,073,665 B2
(45) Date of Patent: Jul. 27, 2021

(54) METHOD FOR MANUFACTURING OPTICAL CONNECTING COMPONENT AND JIG USED IN THIS MANUFACTURING METHOD

(71) Applicant: SUMITOMO ELECTRIC INDUSTRIES, LTD., Osaka (JP)

(72) Inventors: Yasuomi Kaneuchi, Osaka (JP); Tetsu Morishima, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 393 days.

(21) Appl. No.: 16/016,762

(22) Filed: Jun. 25, 2018

(65) Prior Publication Data
US 2018/0372965 A1 Dec. 27, 2018

(30) Foreign Application Priority Data
Jun. 27, 2017 (JP) .............................. JP2017-125013

(51) Int. Cl.
*G02B 6/00* (2006.01)
*G02B 6/38* (2006.01)
*C09J 5/02* (2006.01)
*G02B 6/36* (2006.01)

(52) U.S. Cl.
CPC .............. *G02B 6/3898* (2013.01); *C09J 5/02* (2013.01); *G02B 6/3838* (2013.01); *G02B 6/3885* (2013.01); *C09J 2203/00* (2013.01); *G02B 6/3644* (2013.01); *G02B 6/3861* (2013.01)

(58) Field of Classification Search
CPC .. G02B 6/3898; G02B 6/3838; G02B 6/3885; C09J 5/02
See application file for complete search history.

(56) References Cited

U.S. PATENT DOCUMENTS

2014/0219609 A1* 8/2014 Nielson ................... G02B 6/46
385/54

FOREIGN PATENT DOCUMENTS

| JP | 09133842 A | * | 5/1997 | ........... G02B 6/3879 |
| JP | 2000-304981 A | | 11/2000 | |
| JP | 2014-225036 A | | 12/2014 | |

OTHER PUBLICATIONS

Nozawa et al., "connection jig of fiber tape connection ferrule in optical communication network" machine translation. (Year: 1997).*

* cited by examiner

Primary Examiner — Jeffry H Aftergut
Assistant Examiner — Jaeyun Lee
(74) Attorney, Agent, or Firm — Faegre Drinker Biddle & Reath LLP

(57) ABSTRACT

A method for manufacturing an optical connecting component includes the steps of inserting an optical fiber into one through hole of a plurality of through holes of a connector, rotating the optical fiber around an axis of the optical fiber in the one through hole and aligning and holding the optical fiber at a predetermined position, blocking the end part of a through hole adjacent to the one through hole into which the optical fiber is inserted with a jig on an end face of the connector provided with the plurality of through holes, and fixing the optical fiber to the connector in a state in which the end part of the adjacent through hole is blocked.

3 Claims, 5 Drawing Sheets

METHOD FOR MANUFACTURING OPTICAL CONNECTING COMPONENT AND JIG USED IN THIS MANUFACTURING METHOD

BACKGROUND OF THE INVENTION

Field of the Invention

The present invention relates to a method for manufacturing an optical connecting component and a jig used in this manufacturing method.

Description of the Related Art

In Japanese Unexamined Patent Application Publication No. 2014-225036, a multi-fiber connector for a multi-core optical fiber (hereinafter referred to as MCF) cable is disclosed. The MCF described in Japanese Unexamined Patent Application Publication No. 2014-225036 has a flat side surface for defining a rotation direction, and rotation arrangement of a plurality of MCFs is performed by using this flat side surface. However, it is difficult to form a flat side surface that is flat enough to define the rotation arrangement in the MCF.

SUMMARY OF THE INVENTION

It is an object of the present invention to provide a method for manufacturing an optical connecting component in which each of a plurality of optical fibers can be easily positioned and fixed and a jig used in this manufacturing method.

In an aspect of the present invention, there is provided a method for manufacturing an optical connecting component including the steps of inserting an optical fiber into one through hole of a plurality of through holes of a connector ferrule, rotating the optical fiber around an axis of the optical fiber in the one through hole and aligning and holding the optical fiber at a predetermined position, blocking the end part of an adjacent through hole adjacent to the one through hole into which the optical fiber is inserted with a jig on an end face of the connector ferrule provided with the plurality of through holes, and fixing the optical fiber to the connector ferrule in a state in which the end part of the adjacent through hole is blocked.

In the method for manufacturing an optical connecting component of the present invention, the jig may have a plate and a pin provided on one main surface of the plate, and the end part of the adjacent through hole may be blocked by inserting the pin into the adjacent through hole. The outer diameter of the pin may correspond to the inner diameter of the through holes.

In another aspect of the present invention, there is provided a jig used in a method for manufacturing an optical connecting component in which an optical fiber is inserted into and fixed to a through hole of a connector, the jig including a plate and a pin that can be inserted into the through hole.

According to the present invention, there are provided a method for manufacturing an optical connecting component in which each of a plurality of optical fibers can be easily positioned and fixed and a jig used in this manufacturing method.

DESCRIPTION OF THE PREFERRED EMBODIMENTS

Specific examples of a method for manufacturing an optical connecting component according to the present invention and a jig used in this manufacturing method will be described below with reference to the drawings. The scope of the present invention is not limited to these exemplifications, and is indicated by the claims, and all changes which come within the meaning and range of equivalency of the claims are intended to be embraced therein.

Figure 1:
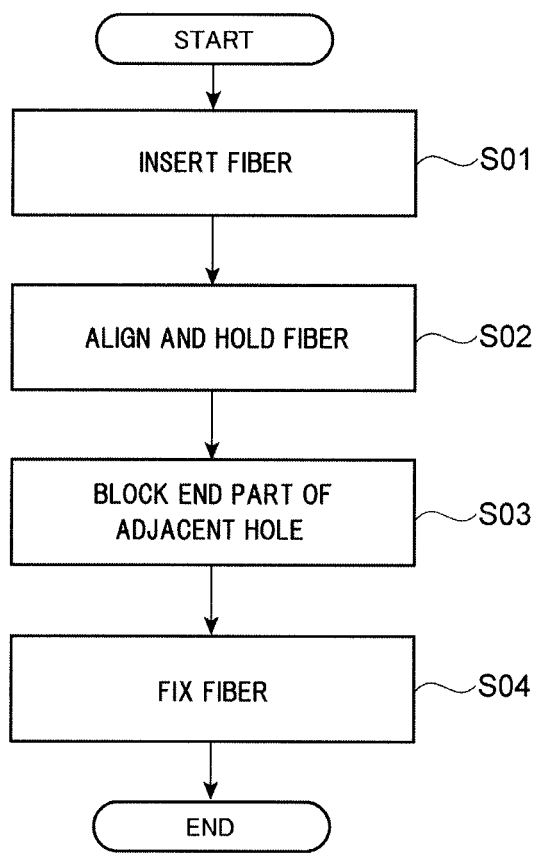
FIG. 1 is a flow diagram illustrating a method for manufacturing an optical connecting component according to an embodiment of the present invention.

FIG. 1 is a flow diagram illustrating a method for manufacturing an optical connecting component according to an embodiment of the present invention. The method for manufacturing an optical connecting component is performed by repeating the step (S01) of inserting a fiber into a through hole of a connector ferrule, the step (S02) of rotating the fiber around its axis in the through hole, aligning the fiber at a predetermined position, and holding the fiber, the step (S03) of blocking the end part of an adjacent hole with a jig, and the step (S04) of fixing the fiber. In the method for manufacturing an optical connecting component according to the present embodiment, an optical connecting component such as an optical connector is manufactured.

Figure 2:
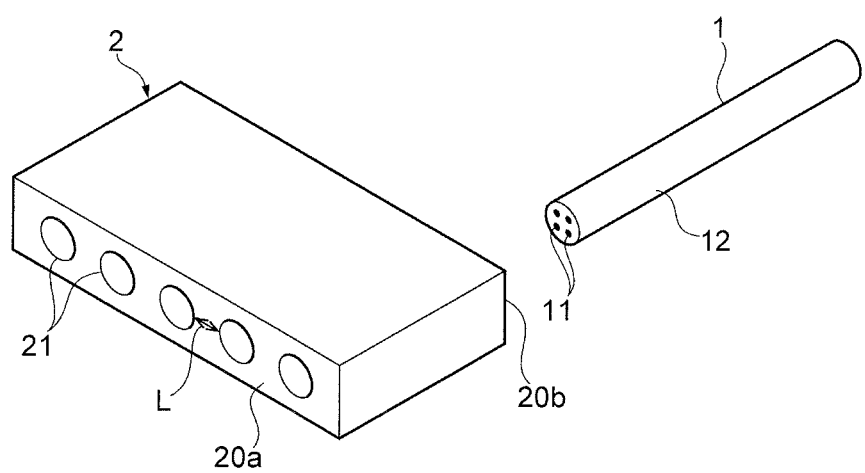
FIG. 2 is a view illustrating a multi-core optical fiber and a connector ferrule used in the method for manufacturing an optical connecting component of the present invention.

FIG. 2 shows a multi-core optical fiber (MCF) 1 before insertion and a connector ferrule 2 used in the method for manufacturing an optical connecting component of the present invention. Although one MCF 1 is shown in FIG. 2, a plurality of MCFs 1 are attached to the connector ferrule 2 to manufacture an optical connecting component.

The MCF 1 has a plurality of cores 11 extending along a predetermined direction and a clad 12 collectively covering the plurality of cores 11. In the MCF 1, four cores 11 are covered by the clad 12, but the number and arrangement of the cores 11 are not particularly limited. The outer periphery of the MCF 1 may be covered by a covering portion. When the outer shape of the MCF 1 is circular, the manufacturing method for an optical connecting component according to the present embodiment is preferably used, but the outer shape of the MCF 1 is not limited to the circular shape.

The connector ferrule 2 is provided with through holes 21 into which the MCF 1 can be inserted. The connector ferrule 2 is a ferrule for a so-called multi-fiber connector, and a plurality of through holes 21 extend in parallel. Each of the plurality of through holes 21 of the connector ferrule 2 connects the end face 20a on one side and the end face 20b on the other side opposed to the end face 20a. The through holes 21 are arranged at predetermined intervals.

The optical connecting component is manufactured by inserting the MCF 1 into each of the plurality of through holes 21. The MCF 1 inserted (S01) into the through hole 21 of the connector ferrule 2 is aligned and fixed at a predetermined rotational position (S02), and an optical connecting component in which a plurality of MCFs 1 are fixed to the connector ferrule 2 is thereby manufactured.

Figure 3A:
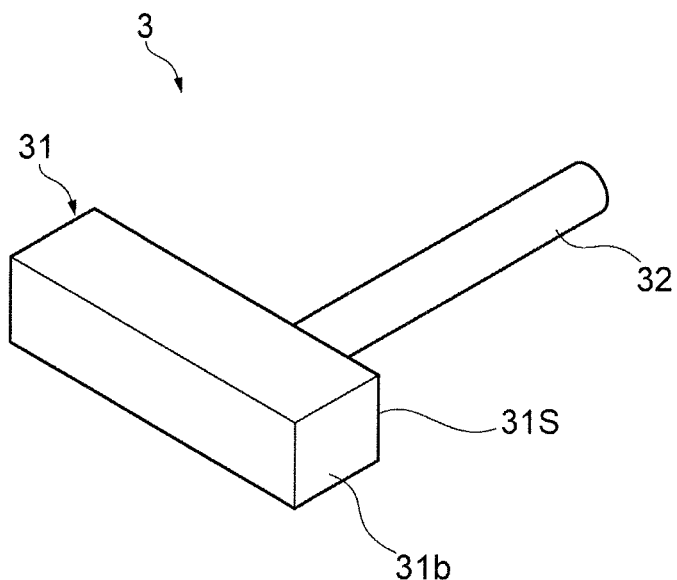
FIG. 3A is a perspective view of a jig according to an embodiment of the present invention.
Figure 3B:
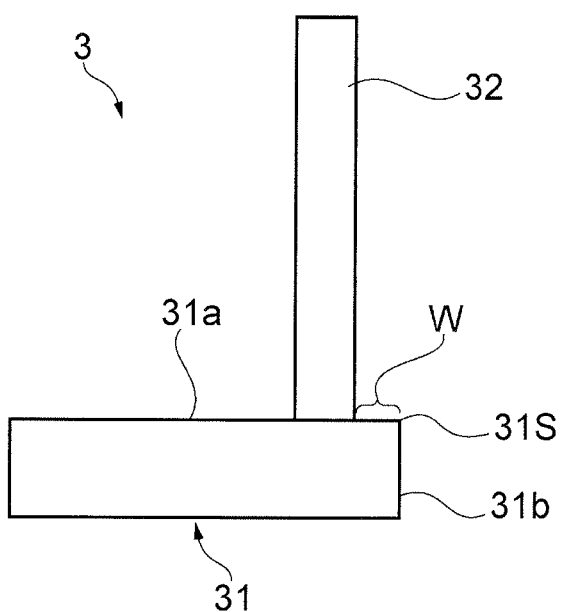
FIG. 3B is a plan view of a jig according to an embodiment of the present invention.

FIG. 3A is a perspective view of a jig 3 used for manufacturing an optical connecting component according to an embodiment of the present invention, and FIG. 3B is a plan view of the jig 3. The jig 3 has a plate 31 and a pin 32 extending from the plate 31. The plate 31 is a plate-like member, and the shape thereof is not particularly limited as long as the surface 31a on which the pin 32 is provided, particularly around the pin 32 is flat. The pin 32 is a columnar member protruding from the plate 31. The pin 32 is inserted into the through hole 21 of the connector ferrule 2. Therefore, it is preferable that the outer diameter of the pin 32 be substantially the same as or slightly smaller than the inner diameter of the through hole 21. However, the outer diameter of the pin 32 may be small as long as the surface 31a on which the pin of the plate 31 is provided is brought into close contact with the connector ferrule 2 when the pin 32 is inserted.

It is not necessary to make the outer diameter of the pin 32 substantially uniform, and the shape of the pin 32 is not particularly limited as long as the outer diameter of at least the end part of the pin 32 on the plate 31 side is a size corresponding to the through hole 21 of the connector ferrule 2 as described above and the outer diameter on the other side is smaller than that. The length of the pin 32 is not particularly limited, either. In the case of the jig 3, the length of the pin 32 is larger than the length of the through hole 21 of the connector ferrule 2.

Although the attachment position of the pin 32 to the plate 31 can be appropriately changed, the pin 32 is provided at a position where the shortest distance W from the end part 31 S of the surface 31a of the plate 31 is smaller than the distance L (see FIG. 2) between the plurality of through holes 21 of the connector ferrule 2. In FIG. 3B, the distance from the boundary between the surface 31a and the surface 31b in the end part of the surface 31a of the plate 31 is the distance W of the pin 32 from the end part of the plate 31, but the position of the pin 32 may be changed such that the distance from the boundary between the surface 31a and another surface is the distance W.

The step (S03) of blocking the end part of the adjacent hole with the jig is the step of attaching the jig 3 to the connector ferrule 2. The end part of the adjacent hole means a region that includes the end part of the adjacent through hole 21 in the end face 20a of the connector ferrule 2 and its vicinity and to which adhesive need to be applied when an MCF 1 is inserted into and fixed to the through hole 21.

Figure 4A:
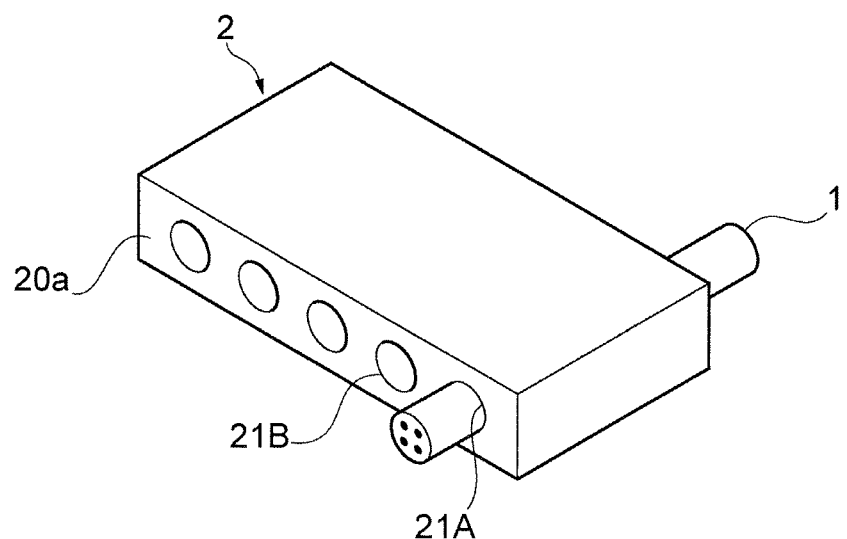
FIG. 4A is a view illustrating the step of inserting a fiber in the method for manufacturing an optical connecting component of FIG. 1.
Figure 4B:
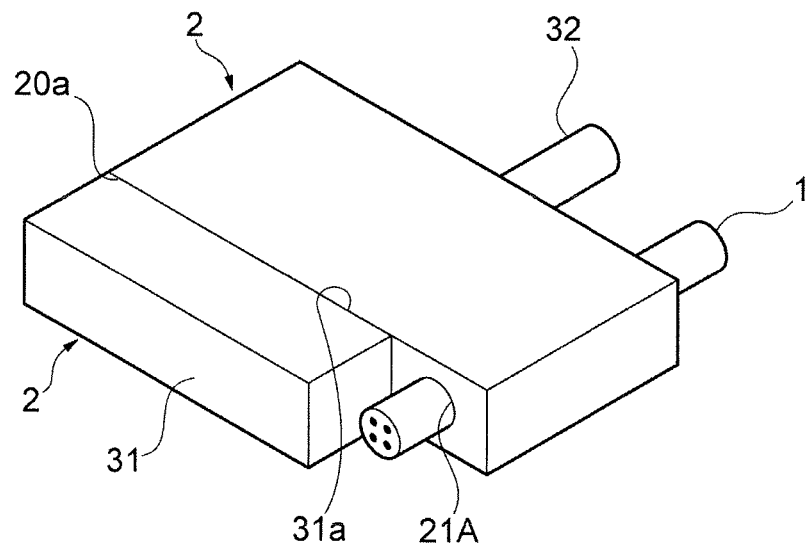
FIG. 4B is a view illustrating the step of blocking the end part of an insertion opening in the method for manufacturing an optical connecting component of FIG. 1.

FIG. 4A shows a state in which the step (S01) of inserting the fiber (MCF 1) into the through hole 21 of the connector ferrule 2 in the method of manufacturing an optical connecting component according to an embodiment of the present invention is performed, and the MCF 1 inserted from the end face 20b side into the endmost through hole 21A of the through holes 21 of the connector ferrule 2 protrudes from the end face 20a side. FIG. 4B is a view illustrating the step of blocking the end part of the insertion opening in the method of manufacturing the optical connecting component according to the embodiment of the present invention, and shows a state in which the pin 32 of the jig 3 is inserted into the through hole 21B adjacent to the through hole 21A, and the jig 3 is inserted until the surface 31a of the plate 31 and the end face 20a of the connector ferrule 2 come into contact with each other. In this state, the pin 32 also passes through the through hole 21B and protrudes from the other end face 20b side of the connector ferrule 2. Thus, by inserting the jig 3 into, of the through holes 21 of the connector ferrule 2, the through hole 21B adjacent to the through hole 21A into which the MCF 1 is inserted, the adjacent through hole 21B is blocked.

The step (S03) of blocking the end part of the adjacent hole with the jig) may be performed before the step (S01) of inserting the fiber (MCF 1) into the through hole 21 of the connector ferrule 2 and the step (S02) of rotating the fiber (MCF 1) in the through hole 21 and aligning and holding it at a predetermined position. That is, after determining in advance a through hole 21 into which the MCF 1 is to be inserted and inserting the pin 32 of the jig 3 into a through hole 21 adjacent thereto to block the through hole 21, the MCF 1 may be inserted into the through hole 21.

The step (S04) of fixing the fiber is performed in a state in which the MCF 1 is inserted and the adjacent through hole 21 is blocked with the jig 3. Specifically, the MCF 1 inserted into the through hole 21A of the connector ferrule 2 is aligned and fixed at a predetermined rotational position. For aligning and fixing the MCF 1, for example, a known method such as using a V-shaped groove plate can be used. At the time of fixation, the MCF 1 is fixed to the through hole 21A of the connector ferrule 2 by introducing an adhesive into and around the through hole 21A. At this time, the through hole 21B adjacent to the through hole 21A is blocked with the jig 3. Therefore, it is possible to prevent the adhesive used for fixing the MCF 1 from flowing into the through hole 21B. After the adhesive solidifies and the MCF 1 is fixed, the jig 3 is removed.

By performing the above steps, it is possible to fix one MCF 1 to the connector ferrule 2. When attaching a second MCF 1 to the connector ferrule 2, the above steps are repeated. For example, when fixing the second MCF 1 to the through hole 21B of the connector ferrule 2, the MCF 1 is inserted into the through hole 21B (S01), the jig 3 is inserted into an adjacent through hole 21 to which an MCF 1 is not yet fixed, and the end part of the through hole 21 is blocked (S03). Thereafter, the MCF 1 inserted in the through hole 21B is aligned (S02) and fixed at a predetermined rotational position with an adhesive or the like (S04). When the adhesive solidifies, the jig 3 is removed. Thus, by repeating a series of steps, a plurality of MCFs 1 can be fixed to the connector ferrule 2 in a state where their respective rotational positions are appropriate, and an optical connecting component in which the MCFs 1 are inserted into all the through holes 21 of the optical connecting component can be manufactured.

As described above, according to the present embodiment of the method for manufacturing an optical connecting component, when fixing the MCF 1 inserted into the through hole 21 (in this case, the through hole 21A) of the connector ferrule 2, the end part of the adjacent through hole 21 (for example, the through hole 21B) is blocked with the jig 3. Therefore, when the MCF 1 inserted into the through hole 21A is positioned and then fixed, adhesive or the like can be prevented from flowing into the adjacent through hole 21B. Therefore, each of the plurality of optical fibers can be easily positioned and fixed.

Conventionally, as a method for positioning an optical fiber when manufacturing an optical connecting component, for example, a method in which rotation is restricted by changing the outer shape of the optical fiber is used. However, when it is necessary to precisely adjust the rotational position according to the position of the core as in the case of an MCF, it is necessary to change the outer shape with high accuracy. On the other hand, when adjusting and fixing the rotational position of the MCF without changing the outer shape, it is difficult to align and fix a plurality of MCFs to be fixed to the connector at the same time. When fixing the MCFs one by one, there is a possibility that the adhesive used to fix one MCF flows into the adjacent through hole. It is conceivable that an MCF cannot be attached to the adjacent through hole. On the other hand, in the method for manufacturing an optical connecting component according to the present embodiment, it is possible to fix the MCFs one by one to the connector and to prevent the adhesive from flowing into the adjacent through hole.

The jig 3 has a plate 31 and a pin 32 provided on one main surface of the plate. By inserting the pin 32 into the adjacent through hole 21, the end part of the through hole 21 is blocked. With such a configuration, it is possible to suitably block the end part of the through hole 21.

The outer diameter of the pin 32 may correspond to the inner diameter of the through hole 21. By causing the outer diameter of the pin to correspond to the through hole 21, the through hole 21 can be blocked more suitably, so that the risk of flowing of the adhesive into the through hole 21 can be further reduced. Further, positional displacement of the jig 3 can be prevented by inserting the pin 32 of the jig 3 into the through hole 21.

The jig 3 used in this embodiment is a jig used in a method for manufacturing an optical connecting component in which an MCF 1 is inserted into and fixed to a through hole 21 of a connector ferrule 2, and has a plate 31 and a pin 32 that can be inserted into the through hole 21. According to the jig 3, when fixing the MCF 1 inserted into the through hole 21 of the connector ferrule 2, by inserting the pin 32 of the jig 3 into the adjacent through hole 21, the end part of the through hole 21 can be suitably blocked with the pin 32 and the plate 31. Therefore, when fixing the MCF 1 inserted into the through hole 21 after positioning, the adhesive can be prevented from flowing into the adjacent through hole 21, and each of the plurality of optical fibers can be easily positioned and fixed.

Figure 5A:
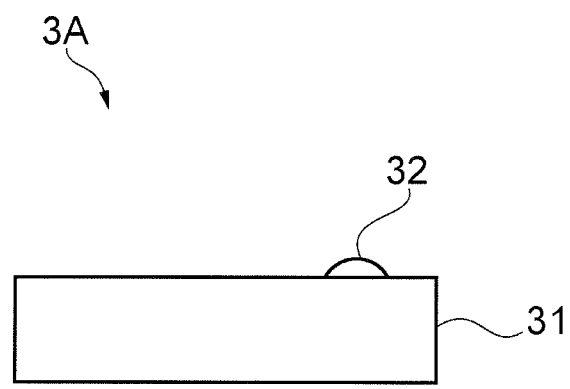
FIG. 5A is a view showing a modification of the jig of the present invention.

The method for manufacturing an optical connecting component and the jig used in this manufacturing method according to the present invention are not limited to the above embodiment. FIG. 5 is a view showing a modification of the jig. As in the jig 3A shown in FIG. 5A, the shape of the pin 32 is not limited to the columnar shape, and it may be any shape as long as it protrudes from the surface 31a of the plate 31. It is not necessary that all of the pin 32 can be inserted into the through hole 21. For example, the base of the pin 32 (the vicinity of the connection region with the plate 31) may have a shape such that it cannot be inserted into the through hole 21. However, as described above, it is preferable to use a jig 3 such that the surface 31a of the plate 31 and the end surface 20a of the connector ferrule 2 can be brought into contact with each other because the spread of the adhesive to the vicinity of the through hole 21 can be suppressed.

Figure 5B:
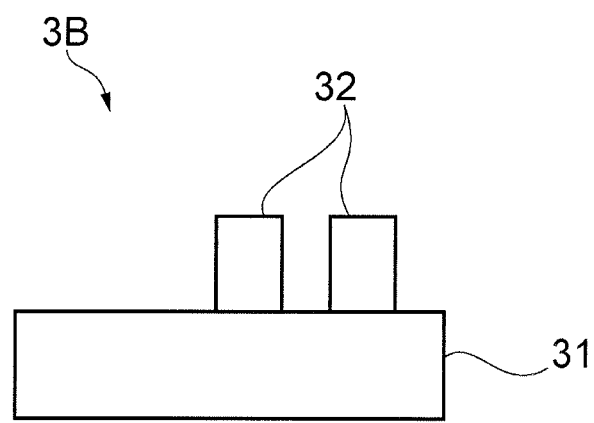
FIG. 5B is a view showing a modification of the jig of the present invention.

The jig 3B shown in FIG. 5B is provided with a plurality of short pins 32. The length of the pin 32 is not particularly limited. The pin 32 may be configured to pass through the through hole 21 as in the jig 3, or may have a length such that it is inserted into only a part of the through hole 21 as in the jig 3B. As in the jig 3B, a plurality of pins 32 may be provided so as to block not only the adjacent through hole 21 but also the through hole 21 adjacent thereto at the same time. In that case, the interval between the adjacent pins 32 is caused to correspond to the interval (the distance L shown in FIG. 2) between the through holes 21.

The jig 3 may not have the plate 31 and the pin 32, and may be constituted only by a plate-like member corresponding to the plate. Even in this case, the end part of the through hole 21 can be blocked. Therefore, by manufacturing an optical connecting component using such a jig, each of the plurality of optical fibers can be easily positioned and fixed. However, when the jig 3 has the pin 32, the fixation (positioning) of the jig 3 is facilitated, so that workability is improved.

The shape of the connector ferrule 2 is not limited to the above embodiment. It is also possible to suitably change the number and arrangement of the through holes 21. In addition, the method for manufacturing an optical connecting component described in the above embodiment can also be applied to an optical connecting component that employs a single-core optical fiber instead of the MCF 1.

What is claimed is:

1. A method for manufacturing an optical connecting component comprising the steps of:
    inserting an optical fiber into one through hole of a plurality of through holes of a connector ferrule;
    rotating the optical fiber around an axis of the optical fiber in the one through hole and aligning and holding the optical fiber at a predetermined position;
    blocking the end part of an adjacent through hole adjacent to the one through hole into which the optical fiber is inserted with a jig on an end face of the connector ferrule provided with the plurality of through holes without blocking the end part of the one through hole; and
    fixing the optical fiber to the connector ferrule by introducing an adhesive into and around the one through hole in a state in which the end part of the adjacent through hole is blocked.

2. The method for manufacturing an optical connecting component according to claim 1, wherein
    the jig has a plate and a pin provided on one main surface of the plate, and the end part of the adjacent through hole is blocked by inserting the pin into the adjacent through hole.

3. The method for manufacturing an optical connecting component according to claim 2, wherein
    the outer diameter of the pin corresponds to the inner diameter of the through holes.

* * * * *